United States Patent [19]
Eisenberg

[11] 3,888,696
[45] June 10, 1975

[54] ELECTROCHEMICAL SYSTEMS EMPLOYING ORGANIC ELECTROLYTIC SOLVENTS

[75] Inventor: Morris Eisenberg, Mountain View, Calif.

[73] Assignee: Electrochimica Corporation, Mountain View, Calif.

[22] Filed: Aug. 13, 1973

[21] Appl. No.: 387,679

Related U.S. Application Data

[63] Continuation-in-part of Ser. No. 173,253, Aug. 19, 1971.

[52] U.S. Cl. .............................. 136/83 R; 136/154
[51] Int. Cl. .......................................... H01m 11/00
[58] Field of Search...... 136/83 R, 100 R, 153, 154, 136/155, 6 WN

[56] References Cited
UNITED STATES PATENTS

| | | | |
|---|---|---|---|
| 3,468,716 | 9/1969 | Eisenberg | 136/155 X |
| 3,508,966 | 4/1970 | Eisenberg | 136/154 X |
| 3,567,515 | 3/1971 | Maricle et al. | 136/154 |

*Primary Examiner*—John H. Mack
*Assistant Examiner*—H. A. Feeley
*Attorney, Agent, or Firm*—Robert B. Kennedy

[57] ABSTRACT

An electrochemical system is disclosed comprising an anode, a cathode, and an electrolyte for electrolytic conduction therebetween. The electrolyte comprises a solvent and a solute dissolved therein. The solvent comprises at least 50 percent by volume nitromethane and less than 50 percent by volume of nitroethane.

7 Claims, No Drawings

ELECTROCHEMICAL SYSTEMS EMPLOYING ORGANIC ELECTROLYTIC SOLVENTS

BACKGROUND OF THE INVENTION

This is a continuation in part of my copending application Ser. No. 173,253 filed Aug. 19, 1971.

This invention relates generally to electrochemical systems such as galvanic cells, and specifically to solvents used therein with solutes in providing electrolytic conduction between system anodes and cathodes.

In U.S. Pat. No. 3,468,716, which patent is assigned to the same assignee as that to which the instant application is assigned, an electrochemical system is disclosed having an electrolytic solvent comprising a pentacyclic ester and a second organic compound selected from the group consisting of aliphatic and cyclic ethers, nitroparaffins, cyclic ketones and aliphatic nitriles. Such organic electrolytes offer advantages over aqueous electrolytes, that is over solutions of salts dissolved in water. A principal advantage is that the organic type electrolytes may be used with a greater selection of active electrode materials. When the potential difference between electrodes is great, such as when the electromotive force exceeds some 2 volts, aqueous electrolytes typically undergo electrolysis and decompose. In addition, many of the more highly active electrode materials are quite unstable in the presence of such solutions.

The electrochemical system disclosed in the just identified patent has been found highly effective where relatively low discharge rates for relatively long periods of time are required. Their stability has been found also to provide long shelf life. However, the presence of viscous pentacyclic esters, such as -butyrolactone or propylene carbonate, resulting in low conductivity electrolytes, has rendered such electrochemical systems poorly suited for relatively high discharge rate requirements over short periods of time.

Accordingly, it is a general object of the present invention to provide an improved electrochemical system employing organic electrolytic solvents.

More specifically, it is an object of the present invention to provide an organic electrolyte electrochemical system having relatively high discharge capabilities.

Yet another object of the invention is to provide an organic electrolytic solvent for electrochemical systems employing at least one highly active electrode such as an anode comprising elements electrochemically less noble than zinc.

SUMMARY OF THE INVENTION

In one form of the invention an electrochemical system is provided comprising an anode including a metal less noble than zinc; a cathode including a halide of a metal selected from the group consisting of copper, nickel, silver, cobalt and iron; and an electrolyte for electrolytic conduction between the anode and cathode. The electrolyte comprises a solute dissolved in a solvent comprising at least 50 percent by volume nitromethane and less than 50 percent by volume nitroethane.

DESCRIPTION OF EXEMPLARY EMBODIMENTS

Cell Preparation

A cupric chloride cathode is prepared by pressing a mixture of 77.5 grams cupric chloride, 17.5 grams of graphite, and 5 grams of dry teflon powder to a 1 inch square expanded nickel grid at a pressure of 2 tons per square inch using 0.425 grams of mixture per plate. The cathode is wrapped in a U-fold of nonwoven polypropylene separator and inserted between two one inch square lithium anodes. These assemblies are placed into a glass epoxy rectangular container and filled with electrolytes prepared by using 10 cc of a given solvent or a solvent mixture in which is dissolved 0.93 grams of lithium chloride and 2.94 grams of aluminum chloride. These quantities of salts correspond to the creation of a mixed salt $LiAlCl_4$ at the concentration level of 2.2 moles per liter.

Solvent Examples

The just described cells have been used with the following solvents: (percentages are volumetric)

Example 1
| | |
|---|---|
| 85% | nitromethane |
| 15% | nitroethane |

Example 11
| | |
|---|---|
| 50% | nitromethane |
| 10% | nitroethane |
| 10% | nitropropane |
| 20% | tetrahydrofuran |
| 10% | acetonitrile |

Example 111
| | |
|---|---|
| 60% | nitromethane |
| 20% | nitroethane |
| 20% | tetrahydrofuran |

Example IV
| | |
|---|---|
| 60% | nitromethane |
| 20% | nitroethane |
| 20% | acetonitrile |

Example V
| | |
|---|---|
| 85% | nitromethane |
| 10% | nitroethane |
| 5% | nitropropane |

Example VI
| | |
|---|---|
| 70% | nitromethane |
| 20% | nitroethane |
| 10% | diethyl ether |

OPERATING CHARACTERISTICS

Example 1
| | |
|---|---|
| Average voltage (volts) | 2.58 |
| Operating time (minutes to 1.5V cut-off | 19.4 |
| Delivered Capacity (A-H to 1.5V | 0.113 |
| % of Theor. Capacity (coulombic efficiency | 87% |

Example 11
| | |
|---|---|
| Average voltage (volts) | 2.30 |
| Operating time (minutes to 1.5V cut-off | 19.5 |
| Delivered Capacity (A-H to 1.5V | 0.109 |
| % of Theor. Capacity (coulombic efficiency) | 84% |

Example 111
| | |
|---|---|
| Average voltage (volts) | 2.27 |
| Operating time (minutes to 1.5V cut-off | 19.0 |
| Delivered Capacity (A-H to 1.5V | 0.1065 |
| % of Theor. Capacity (coulombic efficiency | 82% |

-Continued
OPERATING CHARACTERISTICS

Example 1

Example IV

| | |
|---|---|
| Average voltage (volts) | 2.33 |
| Operating time (minutes to 1.5V cut-off) | 19.9 |
| Delivered Capacity (A-H to 1.5V) | 0.112 |
| % of Theor. Capacity (coulombic efficiency) | 86% |

Example V

| | |
|---|---|
| Average voltage (volts) | 2.28 |
| Operating time (minutes to 1.5V cut-off) | 19.3 |
| Delivered Capacity (A-H to 1.5V) | 0.1075 |
| % of Theor. Capacity (coulombic efficiency) | 83% |

Example VI

| | |
|---|---|
| Average voltage (volts) | 2.19 |
| Operating time (minutes to 1.5V cut-off) | 18.4 |
| Delivered Capacity (A-H to 1.5V) | 0.103 |
| % of Theor. Capacity (coulombic efficiency) | 79.3% |

These operating characteristics were developed by actual tests conducted at room temperature with a load drawing 350 milliamps of current. Tests under these same conditions with pure nitromethane and pure nitroethane produced the following results:

100% nitromethane

| | |
|---|---|
| Average voltage (volts) | 2.45 |
| Operating time (minutes to 1.5V cut-off) | 16.5 |
| Delivered Capacity (A-H to 1.5V) | 0.096 |
| % of Theor. Capacity (coulombic efficiency) | 74% |

100% nitroethane

| | |
|---|---|
| Average voltage (volts) | 2.20 |
| Operating time (minutes to 1.5V cut-off) | 12.7 |
| Delivered Capacity (A-H to 1.5V) | 0.0735 |
| % of Theor. Capacity (coulombic efficiency | 56.6% |

From the foregoing results it is evident that solvents comprising a majority by volume of nitromethane and a minority by volume of nitroethane provide greatly improved coulombic efficiency and increased operating time over solvents consisting of pure nitroethane or nitro methane. The reason for this startling synergistic effect between nitromethane and nitroethane is not yet fully understood.

Alternative Electrodes

For anodes, that is to say the electrodes which donate electrons during system operation, any metal having a low electronegativity or a comparatively low ionization potential may be used. By this is meant to include metals which are less noble than zinc. Examples of such are tellurium, manganese, uranium, beryllium, aluminum, magnesium, sodium, calcium, barium, strontium, potassium, rubidium, and lithium. Of these, lithium is preferred supported on a 60-mesh nickel screen. For cathodes pressed cupric chloride containing 90 percent cupric chloride and 10 percent acetylene black with a suitable binder is preferred with a polypropylene separator interposed between the cathode and the anode. Alternatively, the cathode may comprise a halide of nickel, silver, cobalt or iron intermixed with powders of elemental copper, silver, nickel or carbon.

It should be understood that the just-described embodiments merely illustrate principles of the invention. Many modifications or additions may be made thereto without departure from the spirit and scope of the invention as set forth in the following claims.

I claim:

1. An electrochemical system comprising an anode including a metal less noble than zinc; a cathode including a halide of a metal selected from the group consisting of copper, nickel, silver, cobalt and iron; and an electrolyte for electrolytic conduction between said anode and cathode, said electrolyte comprising a solute dissolved in a solvent comprising at least 50 percent by volume nitromethane and between 10 and 50 percent by volume nitroethane.

2. An electrochemical system in accordance with claim 1 wherein said electrolytic solvent further comprises tetrahydrofuran.

3. An electrochemical system in accordance with claim 1 wherein said electrolytic solvent further comprises diethyl ether.

4. An electrochemical system in accordance with claim 1 wherein said electrolytic solvent further comprises acetonitrile.

5. An electrochemical system in accordance with claim 1 wherein said electrolytic solvent consists essentially of nitromethane and nitroethane.

6. An electrochemical system in accordance with claim 1 wherein said electrolytic solvent comprises nitropropane.

7. An electrochemical system in accordance with claim 1 wherein said solute comprises a Lewis acid.

* * * * *